United States Patent
Zhao

(10) Patent No.: US 12,416,712 B2
(45) Date of Patent: Sep. 16, 2025

(54) RANGING METHOD IN SYNCHRONIZATION SYSTEM, DEVICE AND READABLE STORAGE MEDIUM

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 419 days.

(21) Appl. No.: 18/012,905

(22) PCT Filed: Jul. 16, 2020

(86) PCT No.: PCT/CN2020/102459
§ 371 (c)(1),
(2) Date: Dec. 23, 2022

(87) PCT Pub. No.: WO2022/011650
PCT Pub. Date: Jan. 20, 2022

(65) Prior Publication Data
US 2023/0258789 A1    Aug. 17, 2023

(51) Int. Cl.
*G01S 11/08* (2006.01)
*H04W 64/00* (2009.01)

(52) U.S. Cl.
CPC ........... *G01S 11/08* (2013.01); *H04W 64/003* (2013.01)

(58) Field of Classification Search
CPC .... G01S 11/08; G01S 13/765; H04W 64/003; H04W 56/0015
USPC ...................................................... 455/456.1
See application file for complete search history.

(56) References Cited

U.S. PATENT DOCUMENTS

| 9,485,794 B2 | 11/2016 | Edge |
| 9,648,651 B2 | 5/2017 | Edge |
| 2001/0055311 A1* | 12/2001 | Trachewsky .......... H04L 1/0072 370/445 |

(Continued)

FOREIGN PATENT DOCUMENTS

| CN | 104396298 A | 3/2015 |
| CN | 106872966 A | 6/2017 |

(Continued)

OTHER PUBLICATIONS

International Search Report of PCT/CN2020/102459 dated Mar. 26, 2021, with English translation, (4p).

(Continued)

*Primary Examiner* — Mahendra R Patel
(74) *Attorney, Agent, or Firm* — Arch & Lake LLP

(57) ABSTRACT

A ranging method in a synchronization system is provided. The ranging method is applied to a first terminal device and includes: sending a first ranging signal to a second terminal device; and determining a first time difference, the first time difference is a time difference between a moment when the first terminal device sends the first ranging signal and a first terminal timing, the first time difference is configured to determine a distance between the first terminal device and the second terminal device in combination with a second time difference, and the second time difference is a time difference between a moment when the second terminal device receives the first ranging signal and a second terminal timing.

19 Claims, 6 Drawing Sheets

(56) References Cited

U.S. PATENT DOCUMENTS

| | | | |
|---|---|---|---|
| 2002/0155845 A1* | 10/2002 | Martorana | H04W 64/00 455/456.1 |
| 2004/0027281 A1* | 2/2004 | Akopian | G01S 19/24 342/357.63 |
| 2005/0026563 A1* | 2/2005 | Leeper | G01S 5/14 455/41.1 |
| 2008/0056308 A1* | 3/2008 | Zumsteg | H04J 3/0682 370/503 |
| 2010/0045508 A1* | 2/2010 | Ekbal | G01S 13/765 342/145 |
| 2011/0205958 A1* | 8/2011 | Lim | H04W 28/04 370/315 |
| 2013/0315079 A1 | 11/2013 | Edge | |
| 2013/0316727 A1 | 11/2013 | Edge | |
| 2014/0085137 A1* | 3/2014 | Sin | H04W 64/00 342/385 |
| 2014/0192622 A1* | 7/2014 | Rowe | G01S 5/18 367/117 |
| 2015/0373715 A1* | 12/2015 | Kliger | H04W 52/50 370/329 |
| 2016/0047879 A1 | 2/2016 | Yoon et al. | |
| 2020/0119780 A1* | 4/2020 | Klemmer | H04B 7/0421 |
| 2020/0373675 A1* | 11/2020 | Ahmed | H01Q 1/38 |
| 2021/0033698 A1* | 2/2021 | Heinen | G01S 5/0289 |
| 2021/0076349 A1* | 3/2021 | Ioffe | H04W 74/0808 |
| 2021/0091872 A1* | 3/2021 | Ko | H04J 11/0076 |
| 2021/0314895 A1* | 10/2021 | Lee | H04W 56/0045 |

FOREIGN PATENT DOCUMENTS

| | | | | |
|---|---|---|---|---|
| CN | 106990389 A | | 7/2017 | |
| EP | 1253437 A1 | | 10/2002 | |
| WO | WO-2014089040 A1 | * | 6/2014 | G01S 1/725 |

OTHER PUBLICATIONS

Search Report of EP Application No. 20945446.1 dated Apr. 9, 2024, (9p).

* cited by examiner

RANGING METHOD IN SYNCHRONIZATION SYSTEM, DEVICE AND READABLE STORAGE MEDIUM

CROSS-REFERENCE TO RELATED APPLICATIONS

This application is the national phase application of International Application No. PCT/CN2020/102459, filed Jul. 16, 2020, the entire contents of which are incorporated herein by reference for all purposes.

TECHNICAL FIELD

The present disclosure generally relates to the communication field, and more particularly to ranging methods and apparatuses in a synchronization system, a device, and a readable storage media.

BACKGROUND

Currently, applications based on a distance and an angle between user devices are developing rapidly. A terminal device that supports a ranging function may be more convenient for control and operation, and can expand functional modes of various application scenarios, such as a commodity display scenario, a smart home scenario, a smart city scenario, etc.

In the related art, distance and angle measurements using a direct communication link between users have been implemented in local area communication technologies like a wireless fidelity network (WiFi), an ultra wide band (UWB), a Bluetooth and so on. Among others, ranging methods based on a transmission time include a single side-two way ranging (SS-TWR) method and a double side-two way ranging (DS-TWR) method.

However, the local area communication technologies such as WiFi, UWB and Bluetooth all involve asynchronization systems, but for a synchronization system such as a new radio (NR) system, there is no ranging method to determine a distance between two terminal devices.

SUMMARY

In a first aspect of the present disclosure, there is provided a ranging method in a synchronization system. The ranging method is applied to a first terminal device and includes: sending a first ranging signal to a second terminal device; and determining a first time difference. The first time difference is a time difference between a moment that the first terminal device sends the first ranging signal and a first terminal timing, the first time difference is configured to determine a distance between the first terminal device and the second terminal device in combination with a second time difference, and the second time difference is a time difference between a moment that the second terminal device receives the first ranging signal and a second terminal timing.

In a second aspect of the present disclosure, there is provided a ranging method in a synchronization system. The ranging method is applied to a second terminal device and includes: receiving a first ranging signal from a first terminal device; and determining a second time difference. The second time difference is a time difference between a moment that the second terminal device receives the first ranging signal and a second terminal timing, the second time difference is configured to determine a distance between the first terminal device and the second terminal device in combination with a first time difference, and the first time difference is a time difference between a moment that the first terminal device sends the first ranging signal and a first terminal timing.

In a third aspect of the present disclosure, there is provided a terminal, including: a processor; a transceiver connected to the processor; and a memory for storing instructions executable by the processor. The processor is configured to load and execute the instructions to implement the ranging methods in the synchronization system as described in the first or second aspect of the present disclosure.

In a fourth aspect of the present disclosure, there is provided a non-transitory computer-readable storage medium having stored therein at least one instruction, at least one program, a code set or an instruction set that, when loaded and executed by a processor, causes the ranging methods in the synchronization system as described in the first or second aspect of the present disclosure to be implemented.

In a fifth aspect of the present disclosure, there is provided a non-transitory computer program product. The computer program product includes a computer instruction, and the computer instruction is stored in a computer-readable storage medium. A processor of a computer device reads the computer instruction from the computer readable storage medium and executes the computer instruction to enable the computer device to execute the ranging method in the synchronization system as described in any of above aspects of the present disclosure.

BRIEF DESCRIPTION OF THE DRAWINGS

In order to illustrate the technical solutions in embodiments of the present disclosure more clearly, accompanying drawings that will be involved in the description of the embodiments of the present disclosure will be introduced briefly below. Apparently, the accompanying drawings in the following description only involve some embodiments of the present disclosure, and other drawings may be obtained by those ordinarily skilled in the art based on these drawings without creative labor.

DETAILED DESCRIPTION

In order to make objectives, technical solutions and advantages of the present disclosure clearer, implementations of the present disclosure will be described in detail below with reference to accompanying drawings.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of apparatuses and methods consistent with aspects related to the disclosure as recited in the appended claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Figure 1:
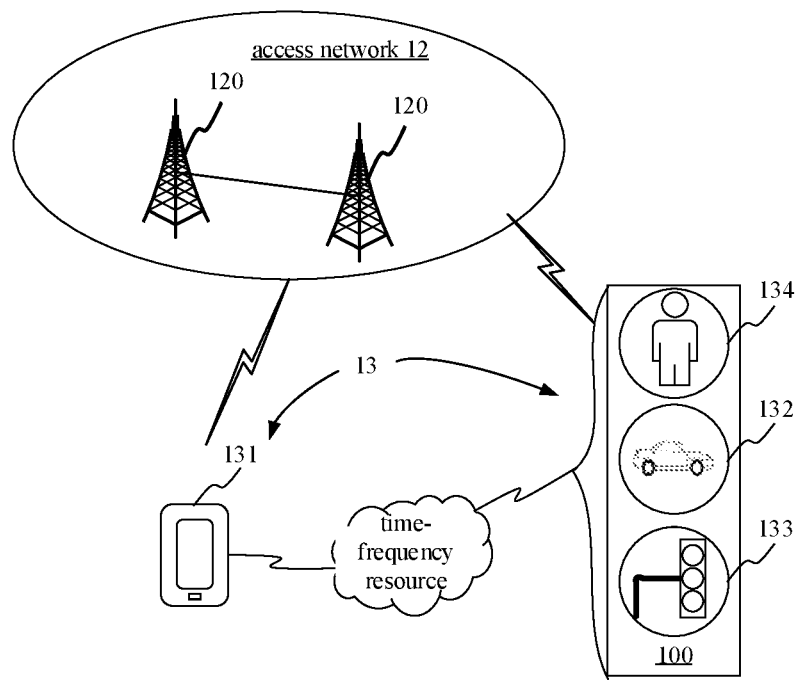
FIG. 1 is a schematic block diagram of a communication system provided by an embodiment of the present disclosure.

FIG. 1 shows a block diagram of a communication system provided by an embodiment of the present disclosure, and the communication system may include: an access network 12 and terminals 13.

The access network 12 includes several access network devices 120. The access network device 120 may be a base station, and the base station is an apparatus deployed in the access network to provide a wireless communication function for terminals. The base station may include various forms of macro base stations, micro base stations, relay stations, access points and so on. A device with a base station function may be named differently in systems using different wireless access technologies, for example, it is called eNodeB or eNB in a long term evolution (LTE) system; and it is called gNodeB or gNB in a 5G new radio (NR) system. With the evolution of communication technology, the name of the base station may change. For the convenience of description, in embodiments of the present disclosure, the above-mentioned apparatus that provides the wireless communication function for terminals are collectively referred to as the access network device.

The terminal 13 may include various devices with the wireless communication function, such as handheld devices, on-board devices, wearable devices, computing devices or other processing devices connected to a wireless modem, as well as various forms of user equipment (UE), mobile stations (MS), terminal devices and so on. For the convenience of description, the devices mentioned above are collectively referred to as terminals. The access network device 120 and the terminal 13 communicate with each other through a certain air interface technology, such as a Uu interface.

In embodiments of the present disclosure, the terminal 13 includes: a vehicle 131, another vehicle 132, an infrastructure 133 and a pedestrian 134.

Vehicle to Vehicle (V2V) refers to a communication between the vehicle 131 and the another vehicles 132. One party of the two vehicles sends its own relevant information to the other party of the two vehicles, and the relevant information includes a driving speed, a geographical location, a driving direction, a driving state, etc.

Vehicle to Infrastructure (V2I) refers to a communication between the vehicle 131 and the infrastructure 133, and the infrastructure 133 includes all the infrastructure encountered by the vehicle as it travels, including traffic lights, bus stations, buildings, tunnels, and other building facilities.

Vehicle to Pedestrian (V2P) refers to a communication between the vehicle 131 and the pedestrian 134. The pedestrian generally refers to an electronic device carried by the pedestrian and having a mobile communication capability, such as a mobile phone and a wearable device. The wearable device includes a smart bracelet, a smart watch, and a smart ring.

In embodiments of the present disclosure, for ease of illustration, for example, the vehicle 131 is referred to as a first terminal, and the another vehicle 132, the infrastructure 133 and the pedestrian 134 are referred to as second terminals, but their roles may also be interchanged, which is not limited herein.

Alternatively, both the first terminal and the second terminal mentioned above support a direct communication, and the above-mentioned communication system may be an NR system or a subsequent evolution system.

In the related art, in local area communication systems such as WiFi, UWB, and Bluetooth, ranging methods based on a transmission time include a single side-two way ranging SS-TWR method and a double side-two way ranging DS-TWR method.

Figure 2:
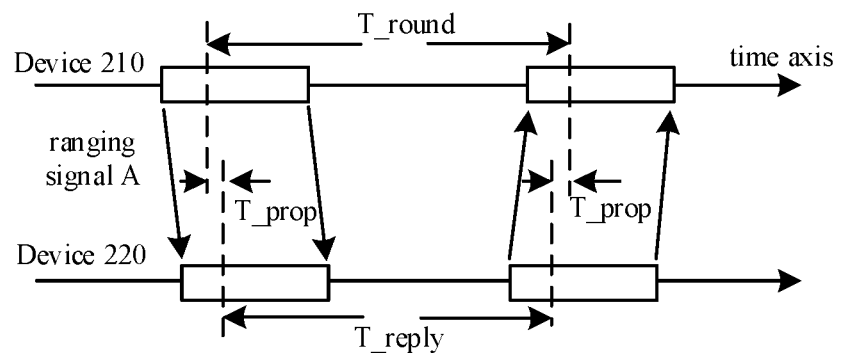
FIG. 2 is a schematic diagram showing a SS-TWR method based on a transmission time in the related art.

Schematically, referring to FIG. 2, which shows the SS-TWR method based on the transmission time in the related art. As shown in FIG. 2, a device 210 sends a ranging signal A to a device 220, the device 220 feeds back a ranging signal B to the device 210 according to the ranging signal A, the device 210 measures a time difference T_round from sending the ranging signal A to receiving the ranging signal B, the device 220 measures a time difference T_reply from receiving the ranging signal A to sending the ranging signal B, the time difference T_round and the time difference T_reply are exchanged between the device 210 and the device 220, then a propagation time T_prop of the ranging signal A and the ranging signal B may be obtained according to the time differences, and a distance between the device 210 and the device 220 is calculated according to the propagation time.

Figure 3:
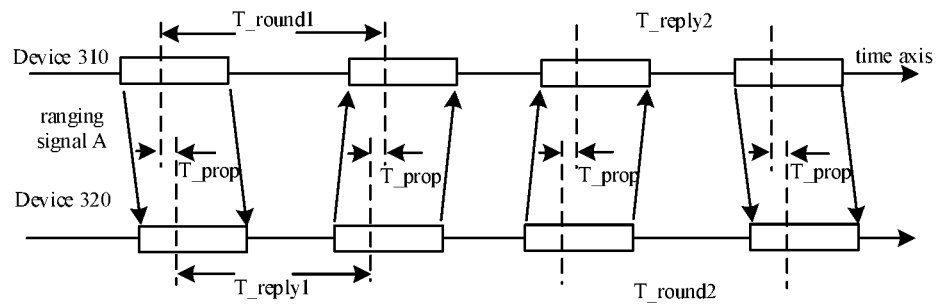
FIG. 3 is a schematic diagram showing a DS-TWR method based on a transmission time in the related art.

Schematically, referring to FIG. 3, which shows the DS-TWR method based on the transmission time in the related art. As shown in FIG. 3, a device 310 and a device 320 each initiate a single side-two way ranging SS-TWR process, and measured values of T_round1, T_round2, T_reply1 and T_reply2 are exchanged between the two devices, based on which a propagation time T_prop is estimated, and a distance between the device 310 and the device 320 is calculated according to the propagation time.

However, the local area communication technologies such as WiFi, Bluetooth and UWB all involve asynchronization systems. However, the NR system is a synchronization system, in the NR system, a user device needs to be synchronized with a reference synchronization source. For example, the synchronization is carried out according to a downlink synchronization signal of a base station, and signals are sent and received according to a given timing. Therefore, in embodiments of the present disclosure, measurements of time differences are simplified by using characteristics of the synchronization system.

Figure 4:
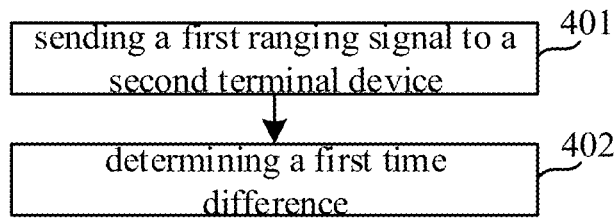
FIG. 4 is a flowchart of a ranging method in a synchronization system provided by an embodiment of the present disclosure.

FIG. 4 is a flowchart of a ranging method in a synchronization system provided by an embodiment of the present disclosure. The method is illustrated with reference to an example where the method is applied to a first terminal device. As shown in FIG. 4, the method includes the following steps.

In step 401, a first ranging signal is sent to a second terminal device

Alternatively, the first terminal device sends the first ranging signal to the second terminal device through a direct communication link.

Alternatively, the first ranging signal is a signal sent by the first terminal device to the second terminal device, and is used to measure a distance between the first terminal device and the second terminal device.

Alternatively, the first ranging signal is a signal sent by the first terminal device when the first terminal device receives a ranging request. For example, the first terminal device receives a service triggering signal, and the distance between the first terminal device and the second terminal device needs to be measured when the service is triggered, then the first terminal device sends the first ranging signal to the second terminal device.

Alternatively, a moment when the first terminal device sends the first ranging signal is a first specified moment within a sending period of the first ranging signal.

Alternatively, the first specified moment includes: a starting moment of the sending period of the first ranging signal; or a terminating moment of the sending period of the first ranging signal; or a peak power occurrence moment within the sending period of the first ranging signal.

Alternatively, the sending period refers to a time period from a moment when the first terminal device starts to send the first ranging signal through a transmitter to a moment when the first terminal device ends to send the first ranging signal.

Alternatively, the first terminal device first determines a first synchronization clock according to a synchronization reference signal.

For example, the first terminal device determines a time unit according to a downlink synchronization signal sent by a network device; or the first terminal device determines the time unit according to its own global positioning system (GPS) signal; or the first terminal device determines the time unit according to a direct connection synchronization signal sent by a third terminal device. The third terminal device includes other terminal devices except for the first terminal device.

Alternatively, the time unit includes any one of an orthogonal frequency division multiplexing (OFDM) symbol, a time slot (slot for short), a subframe, a radio frame (frame for short), a microsecond, a millisecond and a second, or may also be other dividing dimensions, which is not limited in embodiments of the present disclosure. Alternatively, a process for determining the time unit is a process of time-frequency resource synchronization.

Alternatively, after the time unit is determined, the first ranging signal is sent to the second terminal device.

In step 402, a first time difference is determined.

Alternatively, the first time difference is a time difference between a moment when the first terminal device sends the first ranging signal and a first terminal timing.

The first time difference is configured to determine a distance between the first terminal device and the second terminal device in combination with a second time difference. The second time difference is a time difference between a moment when the second terminal device receives the first ranging signal and a second terminal timing.

Alternatively, in response to determining that the first terminal device needs to acquire distance information relative to the second terminal device, the first terminal device determines the first time difference, and determines the distance from the second terminal device according to the first time difference and the second time difference. Alternatively, the first terminal device receives first ranging information sent by the second terminal device, and the first ranging information includes the second time difference.

The moment when the second terminal device receives the first ranging signal is a second specified moment within a receiving period of the first ranging signal.

Alternatively, the second time difference is a time difference determined according to the second specified moment and a first time unit. The second specified moment is the moment when the second terminal device receives the first ranging signal.

That is, when the second terminal device receives the first ranging signal, it determines the second time difference according to the moment when the first ranging signal is received and the second terminal timing.

Alternatively, the second terminal device first determines a second synchronization clock according to its own synchronization reference signal. For example, the second terminal device determines the time unit according to the downlink synchronization signal sent by the network device; or the second terminal device determines the time unit according to its own GPS signal; or the second terminal device determines the time unit according to a direct connection synchronization signal sent by a fourth terminal device. The fourth terminal device includes other terminal devices except for the second terminal device.

Alternatively, the time unit includes any one of an OFDM symbol, a slot, a subframe, a frame, a microsecond, a millisecond, and a second, or may also be other dividing dimensions, which is not limited in embodiments of the present disclosure. Alternatively, a process for determining the time unit is a process of time-frequency resource synchronization.

It should be noted that, the first terminal device and the second terminal device may adopt the same synchronization method or different synchronization methods to determine the time unit. Alternatively, when both the first terminal device and the second terminal device use the downlink synchronization signal sent by the network device to determine the time unit, the first terminal device and the second terminal device may perform synchronization based on the same network device or based on different network devices. For example, the first terminal device performs the synchronization based on a downlink synchronization signal sent by a base station A, and the second terminal device performs the synchronization based on a downlink synchronization signal sent by a base station B; or, the first terminal device performs the synchronization based on the downlink synchronization signal sent by the base station A, and the second terminal device performs the synchronization according to its own GPS signal outside a coverage area of the base station A.

When the first terminal device and the second terminal device adopt different synchronization methods to determine the time unit, there is a slight difference between time unit synchronization of the first terminal device and time unit synchronization of the second terminal device. Alternatively, when determining the distance between the first terminal device and the second terminal device, a distance detection algorithm is used to reduce the impact of the difference between the time unit synchronizations on distance calculation. That is, through the design of the distance detection algorithm, the influence of the difference between the time unit synchronizations on the distance calculation is reduced.

Alternatively, when receiving the first ranging signal, the second terminal device receives the first ranging signal based on blind detection; or the second terminal device receives the first ranging signal on the basis that the second terminal device acquires transmission information of the first ranging signal in advance. For example, if sending the first ranging signal in a first time unit is pre-configured by the base station, the base station sends configuration instructions to the first terminal device and the second terminal device, respectively. The configuration instructions are configured to instruct that the first ranging signal is sent in the first time unit, so that when sending the first ranging signal, the first terminal device sends it in the first time unit, and the second terminal device detects and receives the first ranging signal in the first time unit.

Alternatively, a time, a frequency, a resource location, and a transmission parameter for sending the first ranging signal are pre-agreed between the first terminal device and the second terminal device through direct communication; and the second terminal device receives the first ranging signal according to the agreed time, frequency, resource location and transmission parameter.

Alternatively, the first terminal device periodically sends the first ranging signal, and the second terminal device learns starting positions of the sending cycle and a time domain cycle in advance through base station configuration, direct connection information configuration or pre-configuration, and periodically receives the first ranging signal.

Alternatively, when the second terminal device receives the first ranging signal based on the blind detection, the second terminal device learns frequency domain range information and time domain range information of the blind detection as well as a starting position of a time domain of a resource area and a cycle of the blind detection in advance through base station configuration, direct connection information configuration or pre-configuration, so as to realize the blind detection of the first ranging signal.

Alternatively, the second specified moment within the receiving period of the first ranging signal includes: a starting moment of the receiving period of the first ranging signal; or a terminating moment of the receiving period the first ranging signal; or a peak power occurrence moment within the receiving period of the first ranging signal.

Alternatively, the first specified moment within the sending period of the first ranging signal is of a same type as that of the second specified moment within the receiving period of the first ranging signal. For example, the first specified moment within the sending period of the first ranging signal is the starting moment of the sending period, and the second specified moment within the receiving period of the first ranging signal is the starting moment of the receiving period.

Alternatively, the receiving period refers to a time period from a moment when the second terminal device starts to receive the first ranging signal through a receiver to a moment when the second terminal device ends to receive the first ranging signal.

Alternatively, the first terminal timing includes a starting moment, a terminating moment or a specified moment within the first time unit determined according to the first synchronization clock of the first terminal device. For example, an ending comment of an inner cyclic prefix (CP) of the OFDM symbol is specified within the first time unit.

Alternatively, the second terminal timing includes a starting moment, a terminating moment or a specified moment within the first time unit determined according to the second synchronization clock of the second terminal device. For example, an ending comment of the CP of the OFDM symbol is specified within the first time unit.

For example, in the NR system, the first time unit is a Lth time domain symbol (also referred to as symbol L) in slot N, then the first time difference is a time difference between the moment when the first terminal device sends the first ranging signal and a specified moment within the symbol L. For example, the first time difference is a time difference between a starting moment of the first terminal device sending the first ranging signal and a starting moment of the symbol L. Then, when the first time difference is 0, it indicates that the starting moment of the first terminal device sending the first ranging signal coincides with the starting moment of the first time unit (i.e., the symbol L); when the first time difference is negative, it indicates that the starting moment of the first terminal device sending the first ranging signal is before the starting moment of the first time unit; when the first time difference is positive, it indicates that the starting moment of the first terminal device sending the first ranging signal is after the starting moment of the first time unit. When the first time difference is negative, there exists for example a case where a time unit grid is based on a downlink timing of the base station, while the first ranging signal is sent at a moment after a uplink timing advance (TA) is adjusted.

Figure 5:
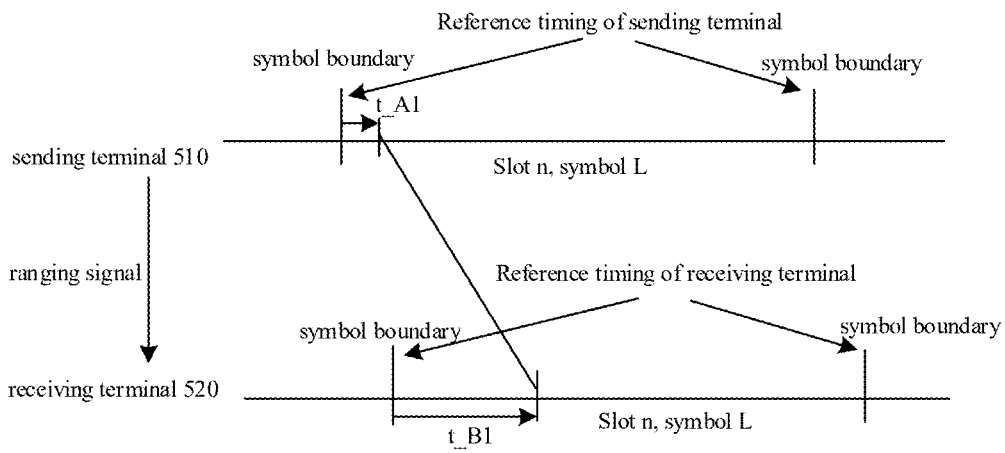
FIG. 5 is a flowchart showing a ranging process provided by an embodiment of the present disclosure.

Schematically, referring to FIG. 5, a sending terminal 510 of a ranging signal determines t_A1 according to a moment when the ranging signal is sent and symbol L in slot n, a receiving terminal 520 determines t_B1 according to a moment when the ranging signal is received and the symbol L in the slot n, so that a distance between these two terminals is determined according to t_A1 and t_B1.

Alternatively, when sending the first ranging signal, the first terminal device adopts a sampling clock with a higher frequency than that used when sending other signals, such as a physical sidelink control channel (PSCCH) and a Physical sidelink share channel (PSSCH), so as to obtain a more accurate time measurement accuracy. That is, the first time difference is measured according to a third synchronization clock of the first terminal device, and a frequency of the third synchronization clock of the first terminal device is higher than that of the first synchronization clock of the first terminal device.

It should be noted that in the related ranging technology based on the transmission time, it is necessary to use a sampling clock with a high sampling rate during the entire T_round for time measurement, but in embodiments of the present disclosure, it is only necessary to use a high sampling rate for accurate time measurement in the first time unit for sending the first ranging signal, thereby reducing the measurement complexity and energy consumption.

Alternatively, in the above description, illustrations are made taking the case where the first time difference is determined according to the moment when the first ranging signal is sent as an example, that is, the first time difference is measured according to the third synchronization clock of the first terminal device. In an alternative embodiment, the first time difference may also be pre-configured, that is, the first terminal device determines the first time difference according to configuration or pre-configuration information; alternatively, the second terminal device determines the second time difference according to configuration or pre-configuration information. Second time difference Alternatively, the first terminal device sends second ranging information to the second terminal device, and the second ranging information includes the first time difference.

Figure 6:
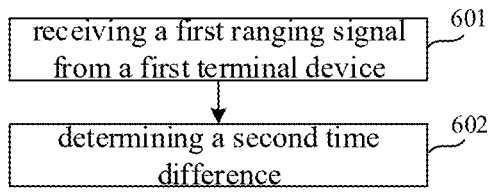
FIG. 6 is a flowchart of a ranging method in a synchronization system provided by an embodiment of the present disclosure, which is illustrated from a second terminal device side.

Alternatively, corresponding to the first terminal device side, FIG. 6 is a flowchart of a ranging method in a synchronization system, which is illustrated from a second terminal device side. As shown in FIG. 6, the process includes the following steps.

In step 601: a first ranging signal is received from a first terminal device.

Alternatively, when the second terminal device receives the first ranging signal in a first time unit, in order to avoid a tiny difference in time synchronization, it starts detection before a starting position of the first time unit.

In step 602, a second time difference is determined.

Alternatively, the second time difference is a time difference between a moment when the second terminal device receives the first ranging signal and a second terminal timing.

Alternatively, the second time difference is configured to determine a distance between the first terminal device and the second terminal device in combination with a first time difference, and the first time difference is a time difference between a moment when the first terminal device sends the first ranging signal and a first terminal timing.

Alternatively, when the second terminal device needs to determine the distance to the first terminal device, the second terminal device acquires the first time difference, and determines the distance to the first terminal device according to the first time difference and the second time difference.

Alternatively, the second terminal device receives second ranging information sent by the first terminal device, and the second ranging information includes the first time difference.

Alternatively, the second terminal device sends first ranging information to the first terminal device, and the first ranging information includes the second time difference.

To sum up, according to the methods provided by embodiments of the present disclosure, in the synchronous system, by sending the first ranging signal from the first terminal device to the second terminal device, determining the second time difference according to the moment when the first ranging signal is received and the second terminal timing, and determining the first time difference according to the moment when the first ranging signal is sent and the first terminal timing, the distance between the first terminal device and the second terminal device is determined according to the second time difference and the first time difference, as a result, ranging solutions in the synchronous system are provided.

Figure 7:
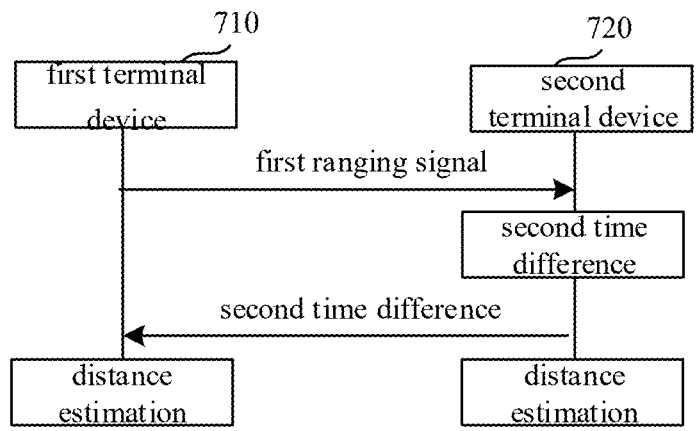
FIG. 7 is a schematic diagram of a ranging method in a synchronization system provided by an embodiment of the present disclosure.

Schematically, FIG. 7 shows a schematic diagram of a ranging method provided by an embodiment of the present disclosure, as shown in FIG. 7, a first terminal device 710 sends a first ranging signal to a second terminal device 720, and the second terminal device 720 determines a second time difference according to the received first ranging signal.

The first terminal device 710 sends the first ranging signal according to a preconfigured or predefined first time difference.

Therefore, the second terminal device 720 determines a distance between the first terminal device 710 and the second terminal device 720 according to the preconfigured or predefined first time difference in combination with the second time difference.

The second terminal device 720 feeds back the second time difference to the first terminal device 710, so that the first terminal device 710 determines the distance between the first terminal device 710 and the second terminal device 720 according to the second time difference and the first time difference.

The first time difference involved in this process is preconfigured or predefined, and the involved ranging is one-way ranging, that is, only the first terminal device needs to send the first ranging signal to the second terminal device unidirectional.

Figure 8:
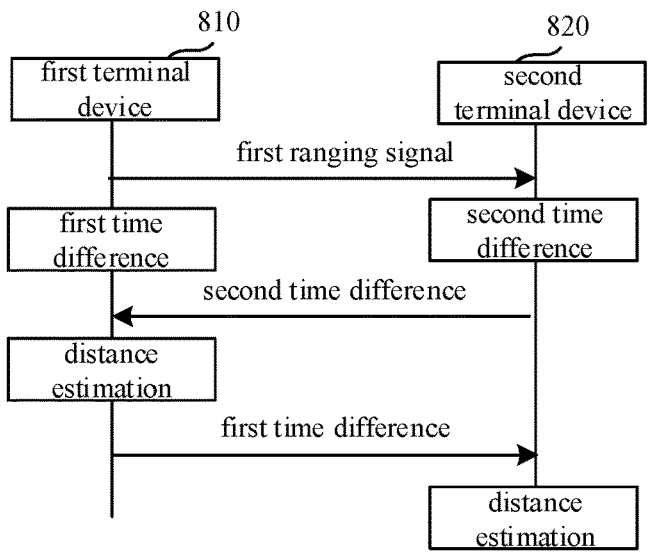
FIG. 8 is a schematic diagram of a ranging method in a synchronization system provided by another embodiment of the present disclosure.

Schematically, FIG. 8 shows a schematic diagram of a ranging method provided by another embodiment of the present disclosure, as shown in FIG. 8, a first terminal device 810 sends a first ranging signal to a second terminal device 820, and the second terminal device 820 determines a second time difference according to the received first ranging signal.

The first terminal device 810 determines a first time difference according to the sending of the first ranging signal.

The second terminal device 820 feeds back the second time difference to the first terminal device 810, so that the first terminal device 810 determines a distance between the first terminal device 810 and the second terminal device 820 according to the second time difference and the first time difference.

The first terminal device 810 sends the first time difference to the second terminal device 820, so that the second terminal device determines the distance between the first terminal device 810 and the second terminal device 820 according to the second time difference and the first time difference.

The first time difference involved in this process is determined by the first terminal device 810 according to the sending of the first ranging signal, and the involved ranging is one-way ranging, that is, only the first terminal device needs to send the first ranging signal to the second terminal device unidirectional.

Figure 9:
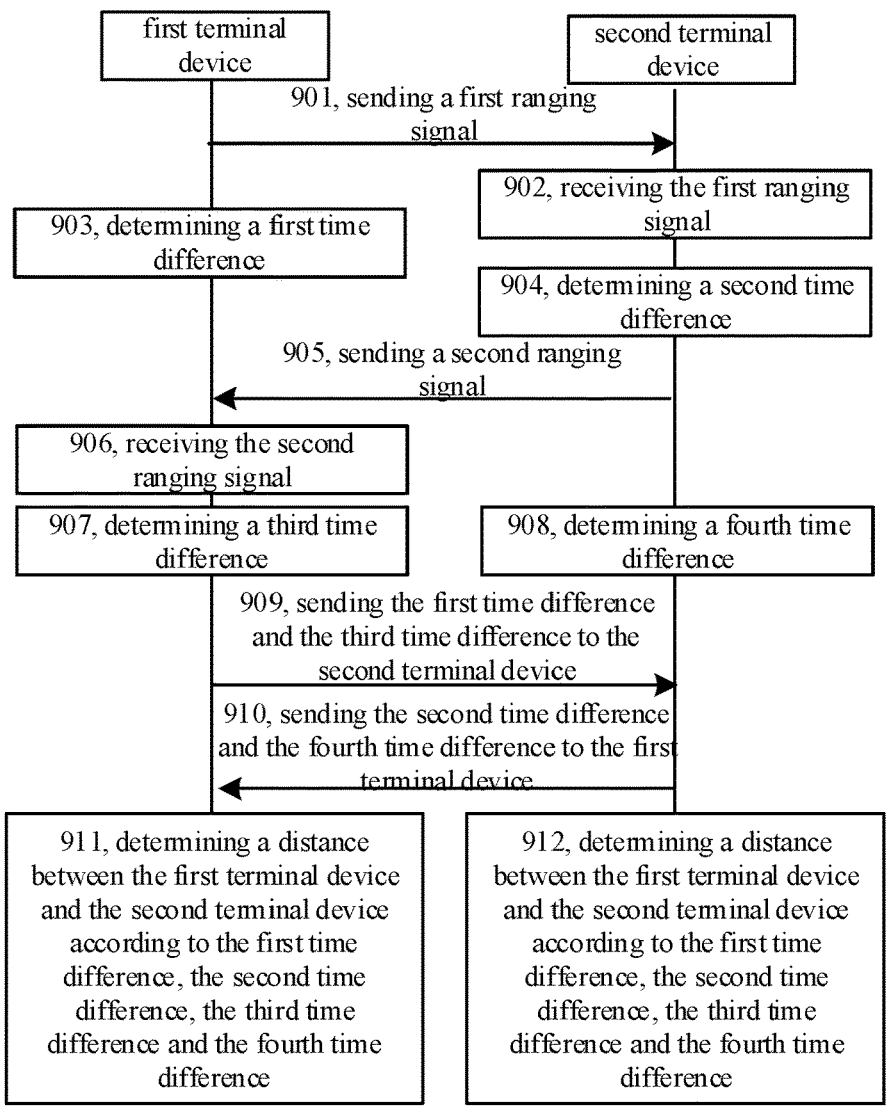
FIG. 9 is a flowchart of a ranging method in a synchronization system provided by another embodiment of the present disclosure.

In an alternative embodiment, distance detection between the first terminal device and the second terminal device is implemented by a SS-TWR method. FIG. 9 is a flowchart of a ranging method in a synchronization system provided by another embodiment of the present disclosure, as shown in 9, the method includes the following steps.

In step 901, a first terminal device sends a first ranging signal to a second terminal device.

Alternatively, the first terminal device first determines a first synchronization clock according to its own synchronization reference signal.

The first terminal device sends the first ranging signal to the second terminal device through a direct communication link. Alternatively, the first ranging signal is used to measure a distance between the first terminal device and the second terminal device.

In step 902, the second terminal device receives the first ranging signal from the first terminal device.

Alternatively, the second terminal device first determines a second synchronization clock according to its own synchronization reference signal. It should be noted that, the first terminal device and the second terminal device may adopt the same synchronization method or different synchronization methods to determine the first synchronization clock and the second synchronization clock.

In step 903, the first terminal device determines a first time difference.

Alternatively, the first time difference is a time difference between a moment when the first terminal device sends the first ranging signal and a first terminal timing.

In step 904, the second terminal device determines a second time difference.

Alternatively, the second time difference is a time difference between a moment when the second terminal device receives the first ranging signal and a second terminal timing.

In step 905, the second terminal device sends a second ranging signal to the first terminal device.

Alternatively, the second terminal device sends the second ranging signal to the first terminal device through a direct communication link.

Alternatively, the second ranging signal is a signal sent by the second terminal device to the first terminal device when the second terminal device receives the first ranging signal. The second ranging signal is used to complete the distance detection between the first terminal device and the second terminal device through a double side-single way ranging method in combination with the first ranging signal.

Alternatively, a moment when the second terminal device sends the second ranging signal is a third specified moment within a sending period of the second ranging signal.

Alternatively, the third specified moment within the sending period of the second ranging signal includes: a starting moment of the sending period of the second ranging signal; or a terminating moment of the sending period of the second ranging signal; or a peak power occurrence moment within the sending period of the second ranging signal.

In step 906, the first terminal device receives the second ranging signal from the second terminal device.

In step 907, the first terminal device determines a third time difference.

Alternatively, the third time difference is a time difference between a moment when the first terminal device receives the second ranging signal and a third terminal timing.

Alternatively, the third terminal timing includes a starting moment, a terminating moment or a specified moment within a second time unit determined according to the first synchronization clock of the first terminal device.

In step 908, the second terminal device determines a fourth time difference.

Alternatively, the fourth time difference is a time difference between a moment when the second terminal device sends the second ranging signal and a fourth terminal timing.

Alternatively, the fourth terminal timing includes a starting moment, a terminating moment or a specified moment within a second time unit determined according to the second synchronization clock of the second terminal device.

Alternatively, the moment when the first terminal device receives the second ranging signal is a fourth specified moment within a receiving period of the second ranging signal.

Alternatively, the fourth specified moment includes: a starting moment of the receiving period of the second ranging signal; or a terminating moment of the receiving period of the second ranging signal; or a peak power occurrence moment within the receiving period of the second ranging signal.

Alternatively, the third specified moment within the sending period of the second ranging signal is of a same type as that of the fourth specified moment within the receiving period of the second ranging signal.

In step 909, the first terminal device sends the first time difference and the third time difference to the second terminal device.

Alternatively, when the second terminal device needs to perform the distance detection, it receives second ranging information sent by the first terminal device, and the second ranging information includes the first time difference and the third time difference.

Alternatively, when sending the first time difference and the third time difference, the first terminal device may directly send values of the first time difference and the third time difference, or may send a difference value between the first time difference and the third time difference.

In step 910, the second terminal device sends the second time difference and the fourth time difference to the first terminal device.

Alternatively, when the first terminal device needs to perform the distance detection, it receives first ranging information sent by the second terminal device, and the first ranging information includes the second time difference and the fourth time difference.

Alternatively, when sending the second time difference and the fourth time difference, the second terminal device may directly send values of the second time difference and the fourth time difference, or may send a difference value between the second time difference and the fourth time difference.

In step 911, the first terminal device determines the distance between the first terminal device and the second terminal device according to the first time difference, the second time difference, the third time difference and the fourth time difference.

In step 912, the second terminal device determines the distance between the first terminal device and the second terminal device according to the first time difference, the second time difference, the third time difference and the fourth time difference.

For example, the first ranging signal is sent by the first terminal device to the second terminal device at symbol l of slot n, and the second ranging signal is sent by the second terminal device to the first terminal device at symbol k of slot m. The first terminal device obtains the first time difference t1 of the first ranging signal and the third time difference t3 of the second ranging signal; and the second terminal device obtains the second time difference t2 of the first ranging signal and the fourth time difference t4 of the second ranging signal. Since the time units used for the transmission of the first ranging signal and the second ranging signal are known to both the sending user device and the receiving user device, Reply time and Round trip time can be calculated according to the time differences through the following formulas:

$$\text{Reply\_time} = (m-n) \times T\_slot + (k-1) \times T\_symbol - (t3+t2);$$
and $$\text{RD\_time} = (m-n) \times T\_slot + (k-1) \times T\_symbol - (t1+t4);$$

where T_slot is a duration of one slot, and T_symbol is a duration of one symbol.

According to an SS-TWR formula, a propagation delay is calculated as:

$$T\_prop = (t1+t2+t3+t4)/2;$$

Therefore, the distance between the two terminals can be predicted according to Reply_time, RD_time and T_prop.

Figure 10:
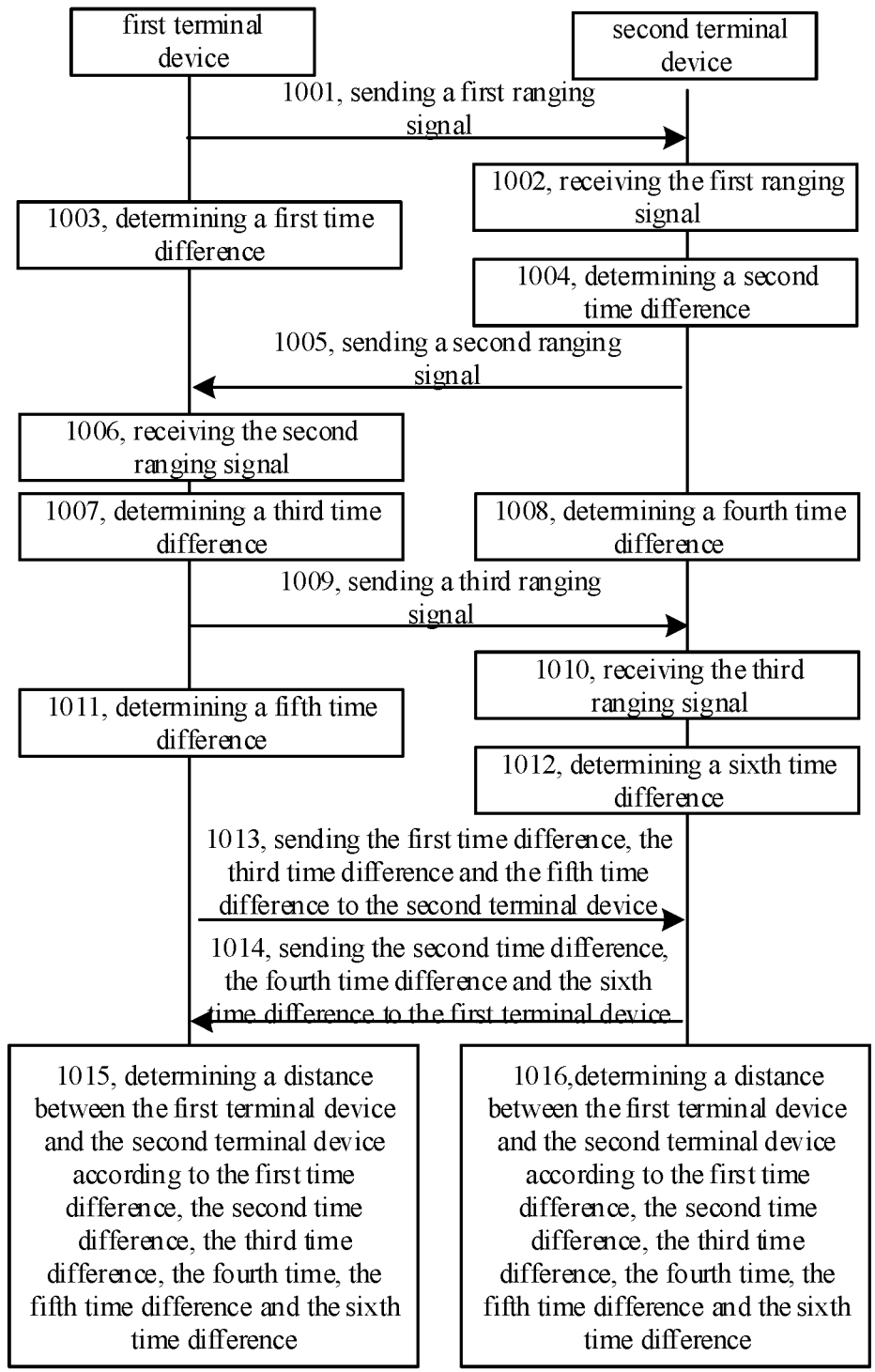
FIG. 10 is a flowchart of a ranging method in a synchronization system provided by another embodiment of the present disclosure.

In an alternative embodiment, the distance detection between the first terminal device and the second terminal device is implemented by a DS-TWR method, and the distance detection between the first terminal device and the second terminal device is performed by transmission of three ranging signals. FIG. 10 is a flowchart of a ranging method in a synchronization system provided by another embodiment of the present disclosure, as shown in 10, the method includes the following steps.

In step 1001, a first terminal device sends a first ranging signal to a second terminal device.

Alternatively, the first terminal device first determines a first synchronization clock according to its own synchronization reference signal.

The first terminal device sends the first ranging signal to the second terminal device through a direct communication link. Alternatively, the first ranging signal is used to measure a distance between the first terminal device and the second terminal device.

In step 1002, the second terminal device receives the first ranging signal from the first terminal device.

Alternatively, the second terminal device first determines a second synchronization clock according to its own synchronization reference signal. It should be noted that, the first terminal device and the second terminal device may adopt the same synchronization method or different synchronization methods to determine the first synchronization clock and the second synchronization clock.

In step 1003, the first terminal device determines a first time difference.

Alternatively, the first time difference is a time difference between a moment when the first terminal device sends the first ranging signal and a first terminal timing.

In step 1004, the second terminal device determines a second time difference.

Alternatively, the second time difference is a time difference between a moment when the second terminal device receives the first ranging signal and a second terminal timing.

In step 1005, the second terminal device sends a second ranging signal to the first terminal device.

Alternatively, a moment when the second terminal device sends the second ranging signal is a third specified moment within a sending period of the second ranging signal.

Alternatively, the third specified moment within the sending period of the second ranging signal includes: a starting moment of the sending period of the second ranging signal; or a terminating moment of the sending period of the second ranging signal; or a peak power occurrence moment within the sending period of the second ranging signal.

In step 1006, the first terminal device receives the second ranging signal.

In step 1007, the first terminal device determines a third time difference.

Alternatively, the third time difference is a time difference between a moment when the first terminal device receives the second ranging signal and a third terminal timing.

In step 1008, the second terminal device determines a fourth time difference.

Alternatively, the fourth time difference is a time difference between the moment when the second terminal device sends the second ranging signal and a fourth terminal timing.

Alternatively, the moment when the first terminal device receives the second ranging signal is a fourth specified moment within a receiving period of the second ranging signal.

Alternatively, the fourth specified moment includes: a starting moment of the receiving period of the second ranging signal; or a terminating moment of the receiving period of the second ranging signal; or a peak power occurrence moment within the receiving period of the second ranging signal.

Alternatively, the third specified moment within the sending period of the second ranging signal is of a same type as that of the fourth specified moment within the receiving period of the second ranging signal.

In step 1009, the first terminal device sends a third ranging signal to the second terminal device.

Alternatively, the first terminal device sends the third ranging signal after sending the first ranging signal; or the first terminal device sends the third ranging signal after receiving the second ranging signal.

Alternatively, a moment when the first terminal device sends the third ranging signal is a fifth specified moment within a sending period of the third ranging signal.

Alternatively, the fifth specified moment within the sending period of the third ranging signal includes: a starting moment of the sending period of the third ranging signal; or a terminating moment of the sending period of the third ranging signal; or a peak power occurrence moment within the sending period of the third ranging signal.

In step 1010, the second terminal device receives the third ranging signal.

In step 1011, the first terminal device determines a fifth time difference.

Alternatively, the fifth time difference is a time difference between a moment when the first terminal device sends the third ranging signal and a fifth terminal timing.

Alternatively, the fifth terminal timing includes a starting moment, a terminating moment or a specified moment within a third time unit determined according to the first synchronization clock of the first terminal device.

In step 1012, the second terminal device determines a sixth time difference.

Alternatively, the sixth time difference is a time difference between a moment when the second terminal device receives the third ranging signal and a sixth terminal timing.

Alternatively, the sixth terminal timing includes a starting moment, a terminating moment or a specified moment within a third time unit determined according to the second synchronization clock of the second terminal device.

Alternatively, the moment when the second terminal device receives the third ranging signal is a sixth specified moment within a receiving period of the third ranging signal.

Alternatively, the sixth specified moment includes: a starting moment of the receiving period of the third ranging signal; or a terminating moment of the receiving period of the third ranging signal; or a peak power occurrence moment within the receiving period of the third ranging signal.

Alternatively, the fifth specified moment within the sending period of the third ranging signal is of a same type as that of the sixth specified moment within the receiving period of the third ranging signal.

In step 1013, the first terminal device sends the first time difference, the third time difference and the fifth time difference to the second terminal device.

Alternatively, when the second terminal device needs to perform distance detection, it receives second ranging information sent by the first terminal device, and the second ranging information includes the first time difference, the third time difference and the fifth time difference.

Alternatively, when the first terminal device sends the first time difference, the third time difference and the fifth time difference, it may directly send values of the first time difference, the third time difference and the fifth time difference, or it may send at least two of: a difference value between the first time difference and the third time difference; a difference value between the third time difference and the fifth time difference; and a difference value between the first time difference and the fifth time difference.

In step 1014, the second terminal device sends the second time difference, the fourth time difference and the sixth time difference to the first terminal device.

Alternatively, when the first terminal device needs to perform distance detection, it receives first ranging information sent by the second terminal device, and the first ranging information includes the second time difference, the fourth time difference and the sixth time difference.

Alternatively, when the second terminal device sends the second time difference, the fourth time difference and the sixth time difference, it may directly send values of the second time difference, the fourth time difference and the sixth time difference, or it may send at least two of: a difference value between the second time difference and the fourth time difference; a difference value between the fourth time difference and the sixth time difference; and a difference value between the second time difference and the sixth time difference.

In step 1015, the first terminal device determines the distance between the first terminal device and the second terminal device according to the second time difference, the first time difference, the third time difference, the fourth time difference, the fifth time difference and the sixth time difference.

In step 1016, the second terminal device determines the distance between the first terminal device and the second terminal device according to the second time difference, the first time difference, the third time difference, the fourth time difference, the fifth time difference and the sixth time difference.

Figure 11:
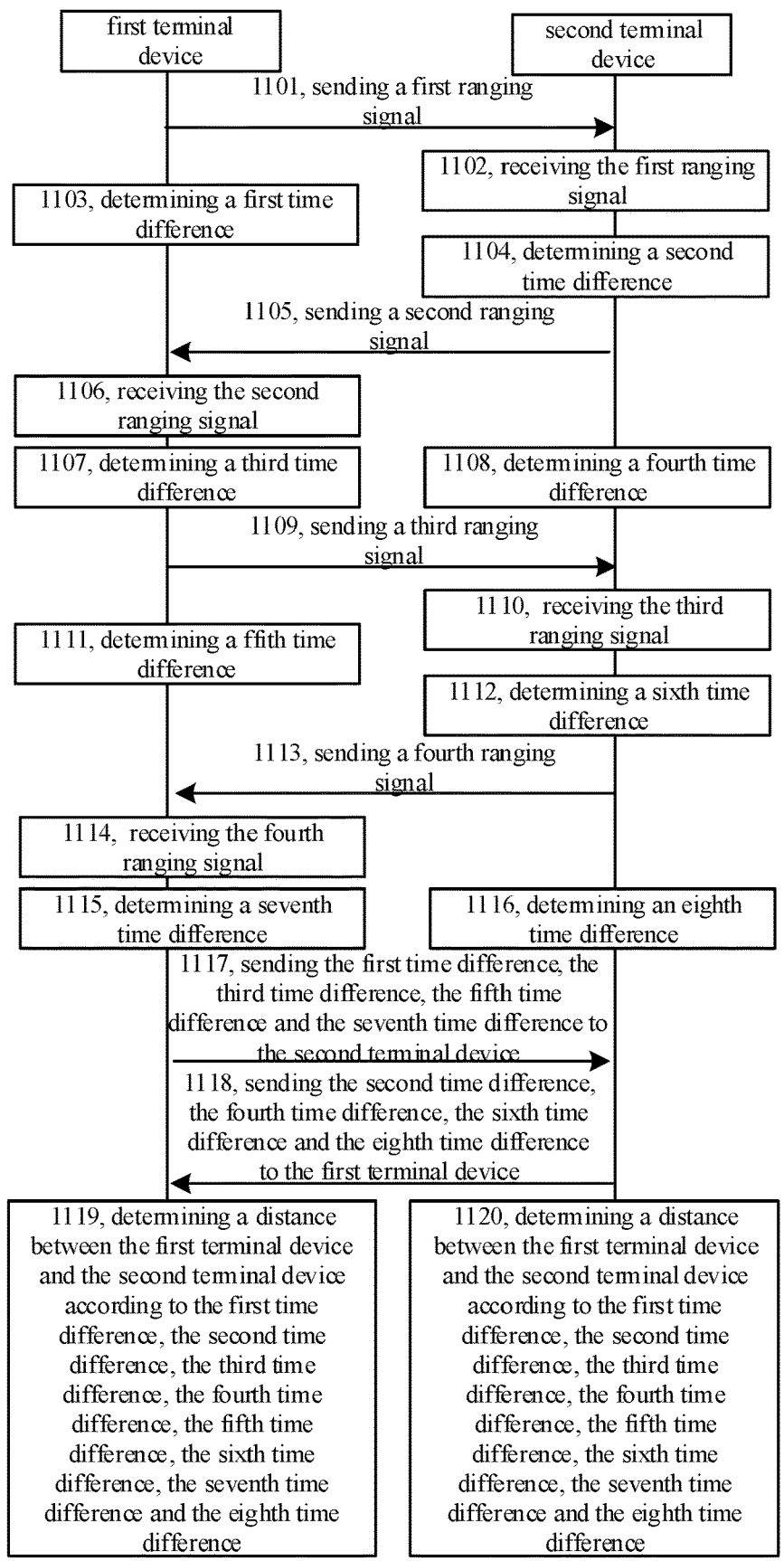
FIG. 11 is a flowchart of a ranging method in a synchronization system provided by another embodiment of the present disclosure.

In an alternative embodiment, the distance detection between the first terminal device and the second terminal device is implemented by a DS-TWR method, and the distance detection between the first terminal device and the second terminal device is performed by transmission of four ranging signals. FIG. 11 is a flowchart of a ranging method in a synchronization system provided by another embodiment of the present disclosure, as shown in 11, the method includes the following steps.

In step 1101, a first terminal device sends a first ranging signal to a second terminal device.

Alternatively, the first terminal device first determines a first synchronization clock according to its own synchronization reference signal.

The first terminal device sends the first ranging signal to the second terminal device through a direct communication link. Alternatively, the first ranging signal is used to measure a distance between the first terminal device and the second terminal device.

In step 1102, the second terminal device receives the first ranging signal from the first terminal device.

Alternatively, the second terminal device first determines a second synchronization clock according to its own synchronization reference signal. It should be noted that, the first terminal device and the second terminal device may adopt the same synchronization method or different synchronization methods to determine the first synchronization clock and the second synchronization clock.

In step 1103, the first terminal device determines a first time difference.

Alternatively, the first time difference is a time difference between a moment when the first terminal device sends the first ranging signal and a first terminal timing.

In step 1104, the second terminal device determines a second time difference.

Alternatively, the second time difference is a time difference between a moment when the second terminal device receives the first ranging signal and a second terminal timing.

In step 1105, the second terminal device sends a second ranging signal to the first terminal device.

Alternatively, the second terminal device sends the second ranging signal to the first terminal device through a direct communication link.

Alternatively, the second ranging signal is a signal sent by the second terminal device to the first terminal device when the second terminal device receives the first ranging signal. The second ranging signal is used to complete the distance detection between the first terminal device and the second terminal device through a double side-single way ranging method in combination with the first ranging signal.

In step 1106, the first terminal device receives the second ranging signal from the second terminal device.

In step 1107, the first terminal device determines a third time difference.

Alternatively, the third time difference is a time difference between a moment when the first terminal device receives the second ranging signal and a third terminal timing.

In step 1108, the second terminal device determines a fourth time difference.

Alternatively, the fourth time difference is a time difference between a moment when the second terminal device sends the second ranging signal and a fourth terminal timing.

In step 1109, the first terminal device sends a third ranging signal to the second terminal device.

Alternatively, a moment when the first terminal device sends the third ranging signal is a fifth specified moment within a sending period of the third ranging signal.

Alternatively, the fifth specified moment within the sending period of the third ranging signal includes: a starting moment of the sending period of the third ranging signal; or a terminating moment of the sending period of the third ranging signal; or a peak power occurrence moment within the sending period of the third ranging signal.

In step 1110, the second terminal device receives the third ranging signal from the first terminal device.

In step 1111, the first terminal device determines a fifth time difference.

Alternatively, the fifth time difference is a time difference between a moment when the first terminal device sends the third ranging signal and a fifth terminal timing.

In step 1112, the second terminal device determines a sixth time difference.

Alternatively, the sixth time difference is a time difference between a moment when the second terminal device receives the third ranging signal and a sixth terminal timing.

In step 1113, the second terminal device sends a fourth ranging signal to the first terminal device.

Alternatively, the second terminal device sends the fourth ranging signal to the first terminal device through a direct communication link.

Alternatively, the fourth ranging signal is a signal sent by the second terminal device to the first terminal device when the second terminal device receives the third ranging signal.

Alternatively, a moment when the second terminal device sends the fourth ranging signal is a seventh specified moment within a sending period of the fourth ranging signal.

Alternatively, the seventh specified moment within the sending period of the fourth ranging signal includes: a starting moment of the sending period of the fourth ranging signal; or a terminating moment of the sending period of the fourth ranging signal; or a peak power occurrence moment within the sending period of the fourth ranging signal.

In step 1114, the first terminal device receives the fourth ranging signal from the second terminal device.

In step 1115, the first terminal device determines a seventh time difference.

Alternatively, the seventh time difference is a time difference between a moment when the first terminal device receives the fourth ranging signal and a seventh terminal timing.

Alternatively, the seventh terminal timing includes a starting moment, a terminating moment or a specified moment within a fourth time unit determined according to the first synchronous clock of the first terminal device.

In step 1116, the second terminal device determines an eighth time difference.

Alternatively, the eighth time difference is a time difference between a moment when the second terminal device sends the fourth ranging signal and an eighth terminal timing.

Alternatively, the eighth terminal timing includes a starting moment, a terminating moment or a specified moment within a fourth time unit determined according to the second synchronous clock of the second terminal device.

Alternatively, the moment when the first terminal device receives the fourth ranging signal is an eighth specified moment within a receiving period of the fourth ranging signal.

Alternatively, the eighth specified moment includes: a starting moment of the receiving period of the fourth ranging signal; or a terminating moment of the receiving period of the fourth ranging signal; or a peak power occurrence moment within the receiving period of the fourth ranging signal.

Alternatively, the seventh specified moment within the sending period of the fourth ranging signal is of a same type as that of the eighth specified moment within the receiving period of the fourth ranging signal.

In step 1117, the first terminal device sends the first time difference, the third time difference, the fifth time difference and the seventh time difference to the second terminal device.

Alternatively, when the second terminal device needs to perform distance detection, it receives second ranging information sent by the first terminal device, and the second ranging information includes the first time difference, the third time difference, the fifth time difference and the seventh time difference.

Alternatively, when the first terminal device sends the first time difference, the third time difference, the fifth time difference and the seventh time difference, it may directly send values of the first time difference, the third time difference, the fifth time difference and the seventh time difference, or it may send a difference value between the first time difference and the third time difference; a difference value between the fifth time difference and the seventh time difference.

In step 1118, the second terminal device sends the second time difference, the fourth time difference, the sixth time difference and the eighth time difference to the first terminal device.

Alternatively, when the first terminal device needs to perform distance detection, it receives first ranging information sent by the second terminal device, and the first ranging information includes the second time difference, the fourth time difference, the sixth time difference and the eighth time difference.

Alternatively, when the second terminal device sends the second time difference, the fourth time difference, the sixth time difference and the eighth time difference, it may directly send values of the second time difference, the fourth time difference, the sixth time difference and the eighth time difference, or it may send a difference value between the second time difference and the fourth time difference; a difference value between the sixth time difference and the eighth time difference.

In step 1119, the first terminal device determines the distance between the first terminal device and the second terminal device according to the first time difference, the second time difference, the third time difference, the fourth time difference, the fifth time difference, the sixth time difference, the seventh time difference and the eighth time difference.

In step 1120, the second terminal device determines the distance between the first terminal device and the second terminal device according to the first time difference, the second time difference, the third time difference, the fourth time difference, the fifth time difference, the sixth time difference, the seventh time difference and the eighth time difference.

Figure 12:
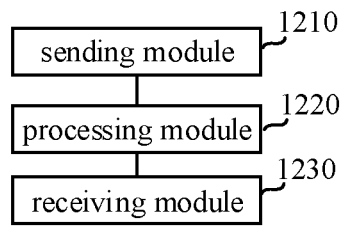
FIG. 12 is a schematic block diagram of a ranging apparatus in a synchronization system provided by an embodiment of the present disclosure.

FIG. 12 is a schematic block diagram of a ranging apparatus in a synchronization system provided by an embodiment of the present disclosure, which is applied to a first terminal device. As shown in FIG. 12, the apparatus includes: a sending module 1210 and a processing module 1220. The sending module 1210 is configured to send a first ranging signal to a second terminal device. The processing module 1220 is configured to determine a first time difference. The first time difference is a time difference between a moment when the first terminal device sends the first ranging signal and a first terminal timing, the first time difference is configured to determine a distance between the first terminal device and the second terminal device in combination with a second time difference, and the second time difference is a time difference between a moment when the second terminal device receives the first ranging signal and a second terminal timing.

In an alternative embodiment, the processing module 1220 is further configured to acquire the second time difference; and determine the distance between the first terminal device and the second terminal device according to the second time difference and the first time difference.

In an alternative embodiment, the moment when the first terminal device sends the first ranging signal is a first specified moment within a sending period of the first ranging signal; and the moment when the second terminal device receives the first ranging signal is a second specified moment within a receiving period of the first ranging signal.

The first specified moment within the sending period of the first ranging signal includes: a starting moment of the sending period of the first ranging signal; or a terminating moment of the sending period of the first ranging signal; or a peak power occurrence moment within the sending period of the first ranging signal.

In an alternative embodiment, the first specified moment within the sending period of the first ranging signal is of a same type as that of the second specified moment within the receiving period of the first ranging signal.

In an alternative embodiment, first terminal timing includes a starting moment, a terminating moment or a specified moment within a first time unit determined according to a first synchronization clock of the first terminal device.

In an alternative embodiment, the processing module 1220 is further configured to determine the first synchronization clock according to a synchronization reference signal.

In an alternative embodiment, the processing module 1220 is further configured to determine the time unit according to a downlink synchronization signal sent by a network device; or the processing module 1220 is further configured to determine the time unit according to a GPS signal; or the processing module 1220 is further configured to determine the time unit according to a direct connection synchronization signal sent by a third terminal device.

In an alternative embodiment, the processing module 1220 is further configured to determine the first time difference according to configuration or pre-configuration information; or the processing module 1220 is further configured to measure the first time difference according to a third synchronization clock of the first terminal device.

In an alternative embodiment, a frequency of the third synchronization clock of the first terminal device is higher than that of the first synchronization clock of the first terminal device.

In an alternative embodiment, the apparatus further includes a receiving module 1230. The receiving module 1230 is configured to receive first ranging information sent by the second terminal device, and the first ranging information includes the second time difference.

In an alternative embodiment, the sending module 1210 is further configured to send second ranging information to the second terminal device, and the second ranging information includes the first time difference.

In an alternative embodiment, the apparatus further includes a receiving module 1230. The receiving module 1230 is configured to receive a second ranging signal from the second terminal device. The processing module 1220 is further configured to determine a third time difference. The third time difference is a time difference between a moment when the first terminal device receives the second ranging signal and a third terminal timing, the third time difference is configured to determine the distance between the first terminal device and the second terminal device in combination with the first time difference, the second time difference, and a fourth time difference, and the fourth time difference is a time difference between a moment when the second terminal device sends the second ranging signal and a fourth terminal timing.

In an alternative embodiment, the sending module 1210 is further configured to send a third ranging signal to the second terminal device. The processing module 1220 is further configured to determine a fifth time difference. The fifth time difference is a time difference between a moment when the first terminal device sends the third ranging signal and a fifth terminal timing, the fifth time difference is configured to determine the distance between the first terminal device and the second terminal device in combination with the first time difference, the second time difference, the third time difference, the fourth time difference, and a sixth time difference, and the sixth time difference is a time difference between a moment when the second terminal device receives the third ranging signal and a sixth terminal timing.

In an alternative embodiment, the apparatus further includes: a receiving module 1230. The receiving module 1230 is configured to receive a fourth ranging signal from the second terminal device. The processing module 1220 is further configured to determine a seventh time difference. The seventh time difference is a time difference between a moment when the first terminal device receives the fourth ranging signal and a seventh terminal timing, the seventh time difference is configured to determine the distance between the first terminal device and the second terminal device in combination with the first time difference, the second time difference, the third time difference, the fourth time difference, the fifth time difference, the sixth time difference and an eighth time difference, and the eighth time difference is a time difference between a moment when the second terminal device sends the fourth ranging signal and an eighth terminal timing.

Figure 13:
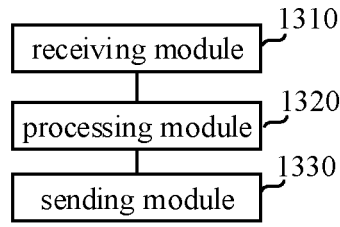
FIG. 13 is a schematic block diagram of a ranging apparatus in a synchronization system provided by another embodiment of the present disclosure.

FIG. 13 is a schematic block diagram of a ranging apparatus in a synchronization system provided by an embodiment of the present disclosure, which is applied to a second terminal device. As shown in FIG. 13, the apparatus includes: a receiving module 1310 and a processing module 1320. The receiving module 1310 is configured to receive a first ranging signal from a first terminal device. The processing module 1320 is configured to determine a second time difference. The second time difference is a time difference between a moment when the second terminal device receives the first ranging signal and a second terminal timing, the second time difference is configured to determine a distance between the first terminal device and the second terminal device in combination with a first time difference, and the first time difference is a time difference between a moment when the first terminal device sends the first ranging signal and a first terminal timing.

In an alternative embodiment, the processing module 1320 is further configured to acquire the first time difference; and determine the distance between the first terminal device and the second terminal device according to the second time difference and the first time difference.

In an alternative embodiment, the moment when the first terminal device sends the first ranging signal is a first specified moment within a sending period of the first ranging signal; and the moment when the second terminal device receives the first ranging signal is a second specified moment within a receiving period of the first ranging signal.

In an alternative embodiment, the first specified moment within the sending period of the first ranging signal includes: a starting moment of the sending period of the first ranging signal; or a terminating moment of the sending period of the first ranging signal; or a peak power occurrence moment within the sending period of the first ranging signal.

In an alternative embodiment, the first specified moment within the sending period of the first ranging signal is of a same type as that of the second specified moment within the receiving period of the first ranging signal.

In an alternative embodiment, the second terminal timing includes a starting moment, a terminating moment or a specified moment within a first time unit determined according to a second synchronization clock of the second terminal device.

In an alternative embodiment, the processing module 1320 is further configured to determine the second synchronization clock according to a synchronization reference signal.

In an alternative embodiment, the processing module 1320 is further configured to determine a time unit according to a downlink synchronization signal sent by a network device; or the processing module 1320 is further configured to determine the time unit according to a GPS signal; or the processing module 1320 is further configured to determine the time unit according to a direct connection synchronization signal sent by a fourth terminal device.

In an alternative embodiment, the processing module 1320 is further configured to determine the first time difference according to configuration or pre-configuration information.

In an alternative embodiment, the processing module 1320 is further configured to measure the second time difference according to a fourth synchronization clock of the second terminal device.

In an alternative embodiment, a frequency of the fourth synchronization clock of the second terminal device is higher than that of the second synchronization clock of the second terminal device.

In an alternative embodiment, the receiving module 1310 is further configured to receive second ranging information sent by the first terminal device, and the second ranging information includes the first time difference.

In an alternative embodiment, the apparatus further includes a sending module 1330. The sending module 1330 is configured to send first ranging information to the first terminal device, and the first ranging information includes the second time difference.

In an alternative embodiment, the apparatus further includes a sending module 1330. The sending module 1330 is configured to send a second ranging signal to the first terminal device. The processing module 1320 is further configured to determine a fourth time difference. The fourth time difference is a time difference between a moment when the second terminal device sends the second ranging signal and a fourth terminal timing, the fourth time difference is configured to determine the distance between the first terminal device and the second terminal device in combination with the first time difference, the second time difference, and a third time difference, and the third time difference is a time difference between a moment when the first terminal device receives the second ranging signal and a third terminal timing.

In an alternative embodiment, the receiving module 1310 is further configured to receive a third ranging signal from the first terminal device. The processing module 1320 is further configured to determine a sixth time difference. The sixth time difference is a time difference between a moment when the second terminal device receives the third ranging signal and a sixth terminal timing, the sixth time difference is configured to determine the distance between the first terminal device and the second terminal device in combination with the first time difference, the second time difference, the third time difference, the fourth time difference, and a fifth time difference, and the fifth time difference is a time difference between a moment when the first terminal device sends the third ranging signal and a fifth terminal timing.

In an alternative embodiment, the apparatus further includes: a sending module 1330. The sending module 1330 is configured to send a fourth ranging signal to the first terminal device. The processing module 1320 is configured to determine an eighth time difference. The eighth time difference is a time difference between a moment when the second terminal device sends the fourth ranging signal and an eighth terminal timing, the eighth time difference is configured to determine the distance between the first terminal device and the second terminal device in combination with the first time difference, the second time difference, the third time difference, the fourth time difference, the fifth time difference, the sixth time difference and a seventh time difference, and the seventh time difference is a time difference between a moment when the first terminal device receives the fourth ranging signal and a seventh terminal timing.

Figure 14:
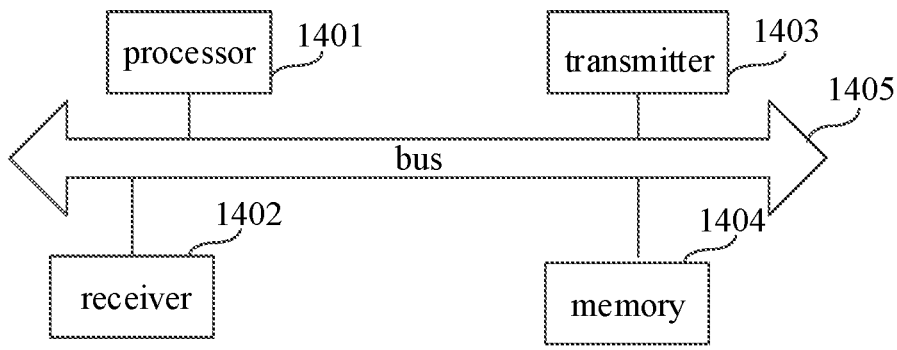
FIG. 14 is a schematic block diagram of a terminal provided by an embodiment of the present disclosure.

FIG. 14 shows a schematic block diagram of a terminal provided by an embodiment of the present disclosure, and the terminal includes: a processor 1401, a receiver 1402, a transmitter 1403, a memory 1404 and a bus 1405.

The processor 1401 includes one or more processing cores, and the processor 1401 executes various functional applications and information processing by running software programs and modules.

The receiver 1402 and the transmitter 1403 may be implemented as a communication component, and the communication component may be a communication chip.

The memory 1404 is connected to the processor 1401 through the bus 1405.

The memory 1404 may be configured to store at least one instruction, and the processor 1401 may be configured to execute the at least one instruction, so as to implement individual steps in the method embodiments as described above.

In addition, the memory 1404 may be implemented using any type of volatile or non-volatile memory devices, or a combination thereof, and the volatile or non-volatile memory devices include, but are not limited to, a magnetic or optical disk, an electrically erasable programmable read only memory (EEPROM), an erasable programmable read only memory (EPROM), a static random-access memory (SRAM), a read only memory (ROM), a magnetic memory, a flash memory, and a programmable read only memory (PROM).

In an embodiment, there is also provided a non-transitory computer readable storage medium including instructions, such as a memory including instructions, and the instructions are executable by a processor of a terminal for implementing the methods performed by the terminal side in the above-described device switching method. For example, the non-transitory computer-readable storage medium may be a ROM, a random access memory (RAM), a CD-ROM, a magnetic tape, a floppy disc, an optical data storage device, and the like.

A non-transitory computer-readable storage medium has stored therein instructions that, when executed by a processor of a terminal, enable the terminal to perform the ranging method in the synchronization system as described above.

Figure 15:
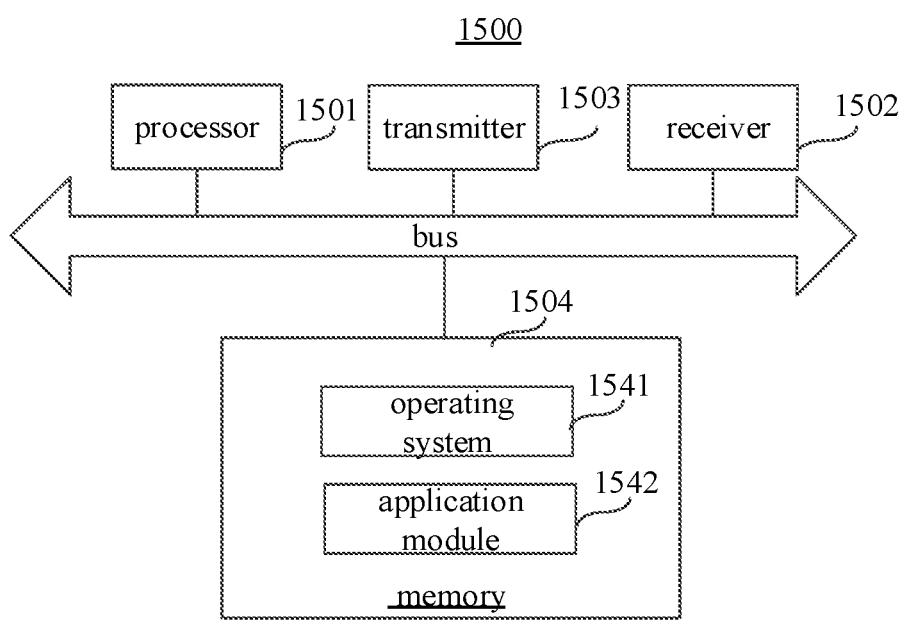
FIG. 15 is a schematic block diagram of a network device provided by an embodiment of the present disclosure.

FIG. 15 shows a block diagram of a network device 1500 according to an embodiment. In some embodiments, the network device 1500 is a base station.

The network device 1500 includes: a processor 1501, a receiver 1502, a transmitter 1503 and a memory 1504. The receiver 1502, the transmitter 1503 and the memory 1504 are respectively connected to the processor 1501 through a bus.

The processor 1501 includes one or more processing cores, and the processor 1501 is configured to execute the method performed by the network device in the device switching method provided by embodiments of the present disclosure by running software programs and modules. The memory 1504 may be configured to store the software programs and the modules. Specifically, the memory 1504 may be configured to store an operating system 1541 and an application module 1542 required by at least one function. The receiver 1502 is configured to receive communication data sent by other devices, and the transmitter 1503 is configured to send communication data to other devices.

A non-transitory computer-readable storage medium has stored therein instructions that, when executed by a processor of a network device, enable the network device to perform the ranging method in the synchronization system as described above.

An embodiment of the present disclosure also provides a communication system, the communication system includes: a terminal and a network device; and the terminal includes the ranging apparatus in the synchronization system provided in the embodiments as shown in FIG. 12 or FIG. 13.

An embodiment of the present disclosure also provides a communication system, the communication system includes: a terminal and a network device; the terminal includes the terminal provided in the embodiment as shown in FIG. 14; and the network device includes the network device provided in the embodiment as shown in FIG. 15.

An exemplary embodiment of the present disclosure also provides a computer-readable storage medium having stored therein at least one instruction, at least one program, a code set or an instruction set that, when loaded and executed by a processor, causes steps performed by a terminal or an access network device of the ranging methods in the synchronization system provided in the above individual method embodiments of the present disclosure to be implemented.

It should be understood that, the term "a plurality of" as mentioned herein means two or more than two. The term "and/or" describes association relationships of associated objects, and indicates that there may exist three types of relationships. For example, the expression "A and/or B" may indicate three cases, i.e., a case where A exists alone, a case where B exists alone, and a case where both A and B exist. The character "/" generally indicates an "or" relationship between associated objects before and after this character.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples are considered as explanatory only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A ranging method in a synchronization system, comprising:
    sending, by a first terminal device, a first ranging signal to a second terminal device;
    determining, by the first terminal device, a first time difference;
    acquiring, by the first terminal device, the second time difference; and
    determining, by the first terminal device, the distance between the first terminal device and the second terminal device according to the second time difference and the first time difference,
    wherein the first time difference is a time difference between a moment that the first terminal device sends the first ranging signal and a first terminal timing,
    the first time difference is configured to determine a distance between the first terminal device and the second terminal device in combination with a second time difference, and
    the second time difference is a time difference between a moment that the second terminal device receives the first ranging signal and a second terminal timing.

2. The method according to claim 1, wherein the moment that the first terminal device sends the first ranging signal is a first specified moment within a sending period of the first ranging signal; and
    The moment that the second terminal device receives the first ranging signal is a second specified moment within a receiving period of the first ranging signal,
    wherein the first specified moment within the sending period of the first ranging signal comprises:
    a starting moment of the sending period of the first ranging signal; or
    a terminating moment of the sending period of the first ranging signal; or
    a peak power occurrence moment within the sending period of the first ranging signal,
    wherein the first specified moment within the sending period of the first ranging signal is of a same type as that of the second specified moment within the receiving period of the first ranging signal.

3. The method according to claim 1, wherein the first terminal timing comprises a starting moment, a terminating moment or a specified moment within a first time unit determined according to a first synchronization clock of the first terminal device,
    wherein the method further comprises:
    determining, by the first terminal, the first synchronization clock according to a synchronization reference signal.

4. The method according to claim 3, further comprising:
    determining the first time unit according to a downlink synchronization signal sent by a network device; or
    determining the first time unit according to a global positioning system signal; or
    determining the first time unit according to a direct connection synchronization signal sent by a third terminal device.

5. The method according to claim 1, wherein determining the first time difference comprises:

determining the first time difference according to configuration or pre-configuration information; or measuring the first time difference according to a third synchronization clock of the first terminal device, wherein a frequency of the third synchronization clock of the first terminal device is higher than that of the first synchronization clock of the first terminal device.

6. The method according to claim 1, further comprising:
receiving, by the first terminal device, a second ranging signal from the second terminal device; and
determining, by the first terminal device, a third time difference,
wherein the third time difference is a time difference between a moment that the first terminal device receives the second ranging signal and a third terminal timing,
the third time difference is configured to determine the distance between the first terminal device and the second terminal device in combination with the first time difference, the second time difference, and a fourth time difference, and
the fourth time difference is a time difference between a moment that the second terminal device sends the second ranging signal and a fourth terminal timing.

7. The method according to claim 6, further comprising:
sending, by the first terminal device, a third ranging signal to the second terminal device; and
determining, by the first terminal device, a fifth time difference,
wherein the fifth time difference is a time difference between a moment that the first terminal device sends the third ranging signal and a fifth terminal timing,
the fifth time difference is configured to determine the distance between the first terminal device and the second terminal device in combination with the first time difference, the second time difference, the third time difference, the fourth time difference, and a sixth time difference, and
the sixth time difference is a time difference between a moment that the second terminal device receives the third ranging signal and a sixth terminal timing.

8. The method according to claim 7, further comprising:
receiving, by the first terminal device, a fourth ranging signal from the second terminal device; and
determining, by the first terminal device, a seventh time difference,
wherein the seventh time difference is a time difference between a moment that the first terminal device receives the fourth ranging signal and a seventh terminal timing,
the seventh time difference is configured to determine the distance between the first terminal device and the second terminal device in combination with the first time difference, the second time difference, the third time difference, the fourth time difference, the fifth time difference, the sixth time difference and an eighth time difference, and
the eighth time difference is a time difference between a moment that the second terminal device sends the fourth ranging signal and an eighth terminal timing.

9. A ranging method in a synchronization system, comprising:
receiving, by a second terminal device, a first ranging signal from a first terminal device;
determining, by the second terminal device, a second time difference;
acquiring, by the second terminal device, the first time difference; and
determining, by the second terminal device, the distance between the first terminal device and the second terminal device according to the second time difference and the first time difference,
wherein the second time difference is a time difference between a moment that the second terminal device receives the first ranging signal and a second terminal timing,
the second time difference is configured to determine a distance between the first terminal device and the second terminal device in combination with a first time difference, and
the first time difference is a time difference between a moment that the first terminal device sends the first ranging signal and a first terminal timing.

10. The method according to claim 9, wherein the moment that the first terminal device sends the first ranging signal is a first specified moment within a sending period of the first ranging signal; and
the moment that the second terminal device receives the first ranging signal is a second specified moment within a receiving period of the first ranging signal,
wherein the first specified moment within the sending period of the first ranging signal comprises:
a starting moment of the sending period of the first ranging signal; or
a terminating moment of the sending period of the first ranging signal; or
a peak power occurrence moment within the sending period of the first ranging signal,
wherein the first specified moment within the sending period of the first ranging signal is of a same type as that of the second specified moment within the receiving period of the first ranging signal.

11. The method according to claim 9, further comprising:
determining, by the second terminal device, the first time unit according to a downlink synchronization signal sent by a network device; or
determining, by the second terminal device, the first time unit according to a global positioning system signal; or
determining, by the second terminal device, the first time unit according to a direct connection synchronization signal sent by a fourth terminal device.

12. The method according to claim 9, wherein determining the second time difference comprises:
measuring the second time difference according to a fourth synchronization clock of the second terminal device,
wherein a frequency of the fourth synchronization clock of the second terminal device is higher than that of the second synchronization clock of the second terminal device.

13. The method according to claim 9, further comprising:
sending, by the second terminal device, a second ranging signal to the first terminal device; and
determining, by the second terminal device, a fourth time difference,
wherein the fourth time difference is a time difference between a moment that the second terminal device sends the second ranging signal and a fourth terminal timing,
the fourth time difference is configured to determine the distance between the first terminal device and the second terminal device in combination with the first time difference, the second time difference, and a third time difference, and the third time difference is a time difference between a moment that the first terminal device receives the second ranging signal and a third terminal timing.

14. The method according to claim 9, further comprising:
receiving, by the second terminal device, a third ranging signal from the first terminal device; and determining, by the second terminal device, a sixth time difference, wherein the sixth time difference is a time difference between a moment that the second terminal device receives the third ranging signal and a sixth terminal timing, the sixth time difference is configured to determine the distance between the first terminal device and the second terminal device in combination with the first time difference, the second time difference, the third time difference, the fourth time difference, and a fifth time difference, and the fifth time difference is a time difference between a moment that the first terminal device sends the third ranging signal and a fifth terminal timing.

15. The method according to claim 14, further comprising:

sending, by the second terminal device, a fourth ranging signal to the first terminal device; and determining, by the second terminal device, an eighth time difference, wherein the eighth time difference is a time difference between a moment that the second terminal device sends the fourth ranging signal and an eighth terminal timing, the eighth time difference is configured to determine the distance between the first terminal device and the second terminal device in combination with the first time difference, the second time difference, the third time difference, the fourth time difference, the fifth time difference, the sixth time difference and a seventh time difference, and the seventh time difference is a time difference between a moment that the first terminal device receives the fourth ranging signal and a seventh terminal timing.

16. A terminal, comprising:
a processor;
a transceiver connected to the processor; and
a memory for storing instructions executable by the processor;
wherein the processor is configured to load and execute the instructions to implement acts comprising:
receiving a first ranging signal from a first terminal device;
determining a second time difference;
acquiring, by the first terminal device, the second time difference; and
determining, by the first terminal device, the distance between the first terminal device and the second terminal device according to the second time difference and the first time difference,
wherein the second time difference is a time difference between a moment that the terminal receives the first ranging signal and a second terminal timing, the second time difference is configured to determine a distance between the first terminal device and the terminal in combination with a first time difference, and the first time difference is a time difference between a moment that the first terminal device sends the first ranging signal and a first terminal timing.

17. A non-transitory computer-readable storage medium having stored therein at least one instruction, at least one program, a code set or an instruction set that, when loaded and executed by a processor, causes the ranging method in the synchronization system according to claim 1 to be implemented.

18. A terminal, comprising:
a processor;
a transceiver connected to the processor; and
a memory for storing instructions executable by the processor;
wherein the processor is configured to load and execute the instructions to implement the ranging method in the synchronization system according to claim 9.

19. A non-transitory computer-readable storage medium having stored therein at least one instruction, at least one program, a code set or an instruction set that, when loaded and executed by a processor, causes the ranging method in the synchronization system according to claim 9 to be implemented.

* * * * *